B. G. COPE.
ANTISKID DEVICE FOR AUTOMOBILE WHEELS
APPLICATION FILED FEB. 2, 1918.
1,268,931.
Patented June 11, 1918.
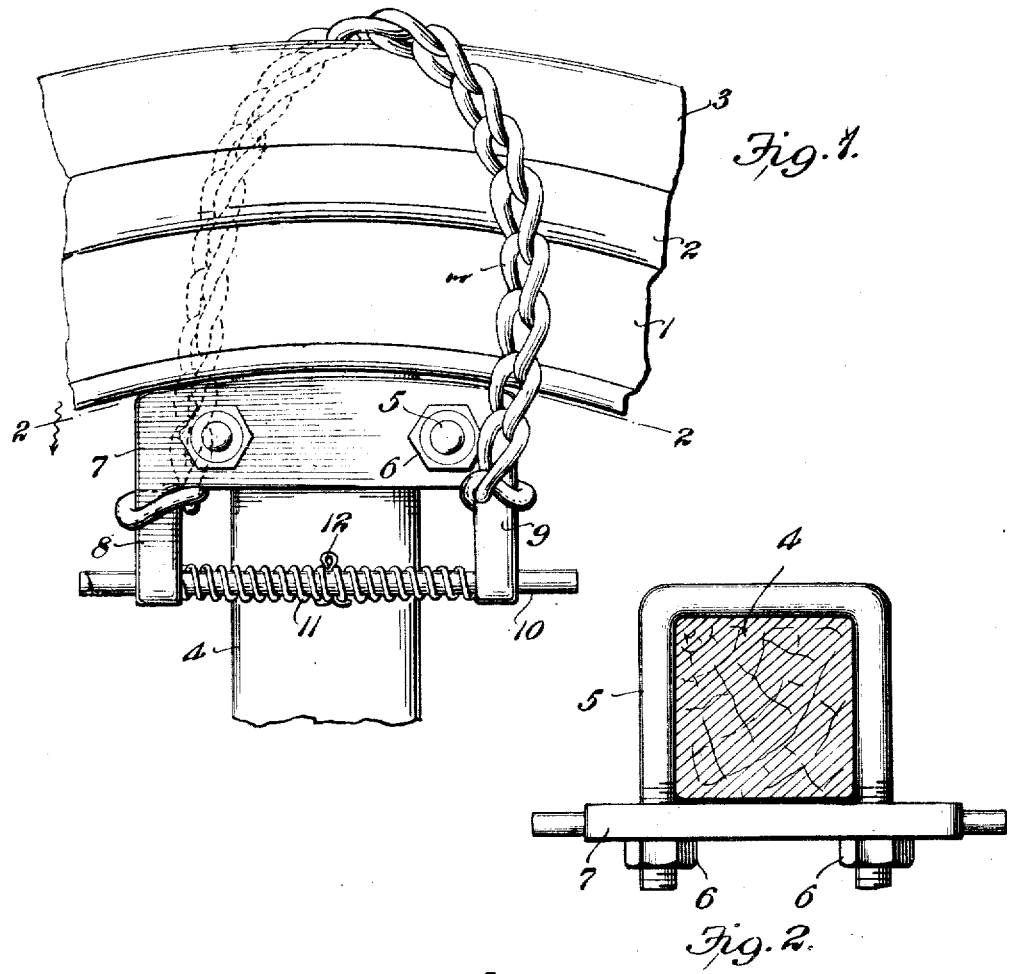
Fig. 1.
Fig. 2.
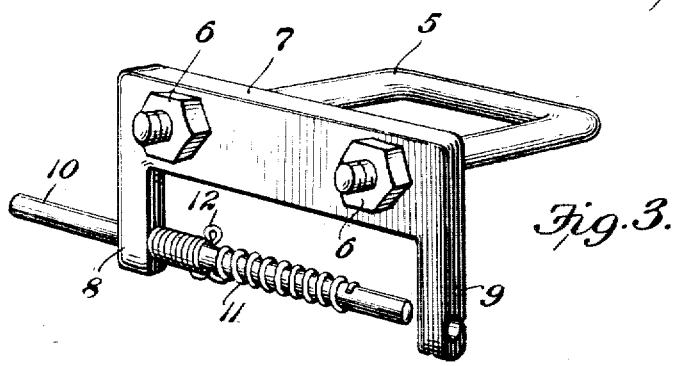
Fig. 3.
Inventor
Burton G. Cope,
By J. W. Bond
Attorney

UNITED STATES PATENT OFFICE.

BURTON G. COPE, OF ORRVILLE, OHIO.

ANTISKID DEVICE FOR AUTOMOBILE WHEELS.

1,268,931.  Specification of Letters Patent.  Patented June 11, 1918.

Application filed February 2, 1918. Serial No. 215,156.

*To all whom it may concern:*

Be it known that I, BURTON G. COPE, a citizen of the United States, residing at Orrville, in the county of Wayne and State of Ohio, have invented a new and useful Antiskid Device for Automobile Wheels, of which the following is a specification.

This invention relates to anti-skid devices for automobile wheels and the like and more particularly to means for securing such device to the wheel of the automobile.

The object of my invention is to provide an attaching means to which chain sections can be easily and quickly applied without special tools and without jacking up the wheel.

Another object is to provide an attaching means of this class which permits the chain to wrap about the tire in a diagonal direction, thereby affording a more effective means of preventing skidding than when the chain runs exactly transverse of the tire.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

In the drawings:

Figure 1 is a side elevation of a fragment of the felly of a wheel with the usual rim and tire shown thereon and with my chain clamping device shown secured to a portion of a spoke.

Fig. 2 is a section taken approximately on the line 2—2 of Fig. 1, and looking in the direction of the arrow.

Fig. 3 is a perspective view of my chain clamping device removed from the spoke and with one end of the spring pressed bolt shown withdrawn to permit the link at one end of the chain to be slipped over the inwardly projecting bifurcations.

Similar numerals of reference indicate corresponding parts throughout the several figures of the drawings.

The felly 1 of the wheel has the usual rim 2 and rubber tire 3 fastened thereon. The spoke 4 has secured at its outer end the U-shaped bolt 5 upon the threaded ends of which is fastened by means of nuts 6, the head member 7 as clearly shown in the drawings. Inwardly projecting portions 8 and 9 formed integral with the head member have slidably mounted, through apertures formed therein, a bolt 10. A coil spring 11 is wrapped about the bolt 10 and a cotter pin 12 is inserted through an opening drilled intermediate the ends of said bolt as shown in Figs. 1 and 3. It will be readily seen that when thus assembled the bolt is held in position by the spring 11, with one of its extremities projecting from each of the portions 8 and 9. When the bolt is moved, as for instance to withdraw its end from the portion 9 the portion of the spring 11 between the cotter pin 12 and the portion 8 will be compressed as in Fig. 3 and likewise when the opposite end of the bolt is withdrawn from the portion 8 the portion of the spring between the cotter pin and the portion 9 will be compressed, but in either case it will immediately assume the position shown in Figs. 1 and 2 when the force employed to withdraw the bolt, is removed. The chain sections 14 are formed of twisted hardened steel links or other suitable material and each section is designed to have its ends secured to the clamping member, as shown in Fig. 1, by withdrawing the bolt member 10 as just described, and slipping the end link at each end of the chain over one of the projections 8 and 9. It will be noted that the chain sections when so secured describe a diagonal course across the face of the tire, thereby adding greatly to the effectiveness to the chain in preventing skidding.

It will be of course understood that one of the above described clamps is to be secured to each spoke of the wheel. The chain sections may be carried in the tool box or other suitable and convenient place and should the wheel of the said car become lodged in a mud hole or rut the chain sections can be applied to such portions of the wheel as remain exposed without the necessity of jacking up the wheel and when the wheel has been partially rotated to bring the portions not equipped with chains into view the remaining clamps can then be equipped with chains. To remove the chain sections it is only necessary to withdraw the ends of the bolt 10 from the portions 8 and 9, as previously described when the ends of the chain can be slipped over the free end of the members 8 and 9.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

Having fully described my invention what I claim as new and desire to secure by Letters Patent, is—

1. In an anti-slipping attachment for vehicle wheels, a head member secured upon the side of a spoke of said wheel, bifurcations upon the said head member, a bolt slidably mounted through apertures in said bifurcations, the extremities of the said bolt being designed to project through the apertures in the said bifurcations and to be withdrawn to permit the opposite end links of a chain section to be passed over said bifurcations, and means upon the said bolt for normally positioning it with its extremities projecting through the apertures in the bifurcations.

2. In an anti-slipping attachment for vehicle wheels, a bifurcated head secured upon the side of a spoke of said wheel, a relatively alined aperture in each of the said bifurcations, a bolt member slidably mounted in the said apertures, a spring mounted upon the said bolt and designed to normally hold the said bolt with its extremities projecting beyond the said bifurcations, the said bolt being adapted to have its extremities withdrawn successively from each of the said bifurcations to permit the ends of a chain member wrapped diagonally about the tire upon the said wheel to be passed over each of the said bifurcations and to be locked against removal therefrom when the bolt returns to normal position.

3. In an anti-slipping attachment for vehicle wheels, a head member, a U-bolt adapted to be fitted about a spoke of the said vehicle wheel and to secure the said head member upon the said spoke, bifurcations upon the said head member adapted to receive a link at the opposite end of a chain member wrapped diagonally about the tire upon the said vehicle wheel, horizontally alined apertures formed in the said bifurcations at a point adjacent their free ends, a sliding bolt adapted to fit within the said apertures and to be positioned with its extremities projecting through the said apertures and to be normally held in said position by a spring coiled about said bolt, the said spring being secured at a point intermediate its ends to the said bolt.

In testimony that I claim the above, I have hereunto subscribed my name.

BURTON G. COPE.